United States Patent [19]

Van Den Bosch

[11] 3,781,847

[45] Dec. 25, 1973

[54] SELECTIVE INFORMATION RETRIEVAL SYSTEMS

[76] Inventor: Francois J. G. Van Den Bosch, 11 Hillcrest Rd., Cedar Grove, N.J. 07009

[22] Filed: Nov. 12, 1971

[21] Appl. No.: 198,458

Related U.S. Application Data

[63] Continuation of Ser. No. 820,595, April 30, 1969, abandoned.

[52] U.S. Cl. .................. 340/324 AD, 178/DIG. 6
[51] Int. Cl. .............................................. G06f 3/14
[58] Field of Search ........................ 178/DIG. 6; 340/324 A, 324 AD

[56] References Cited
UNITED STATES PATENTS

| 3,580,993 | 5/1971 | Sandorf | 178/DIG. 6 |
| 3,578,904 | 5/1971 | Dewey et al. | 178/DIG. 6 |
| 3,459,888 | 8/1969 | Sokolov | 178/DIG. 6 |
| 3,646,257 | 2/1972 | Epstein et al. | 178/DIG. 6 |

Primary Examiner—Thomas B. Habecker
Assistant Examiner—Marshall M. Curtis
Attorney—Watson, Cole, Grindle & Watson

[57] ABSTRACT

A delay network for providing a signal to the sweep generating circuits of a video tube to present thereon a line for every 2½ lines of the line frequency is driven from selected signals within a frequency divider network which also provides a desired frame frequency output signal. A delay gating circuit is provided to control the storage or display of selected information on the video tube.

5 Claims, 3 Drawing Figures

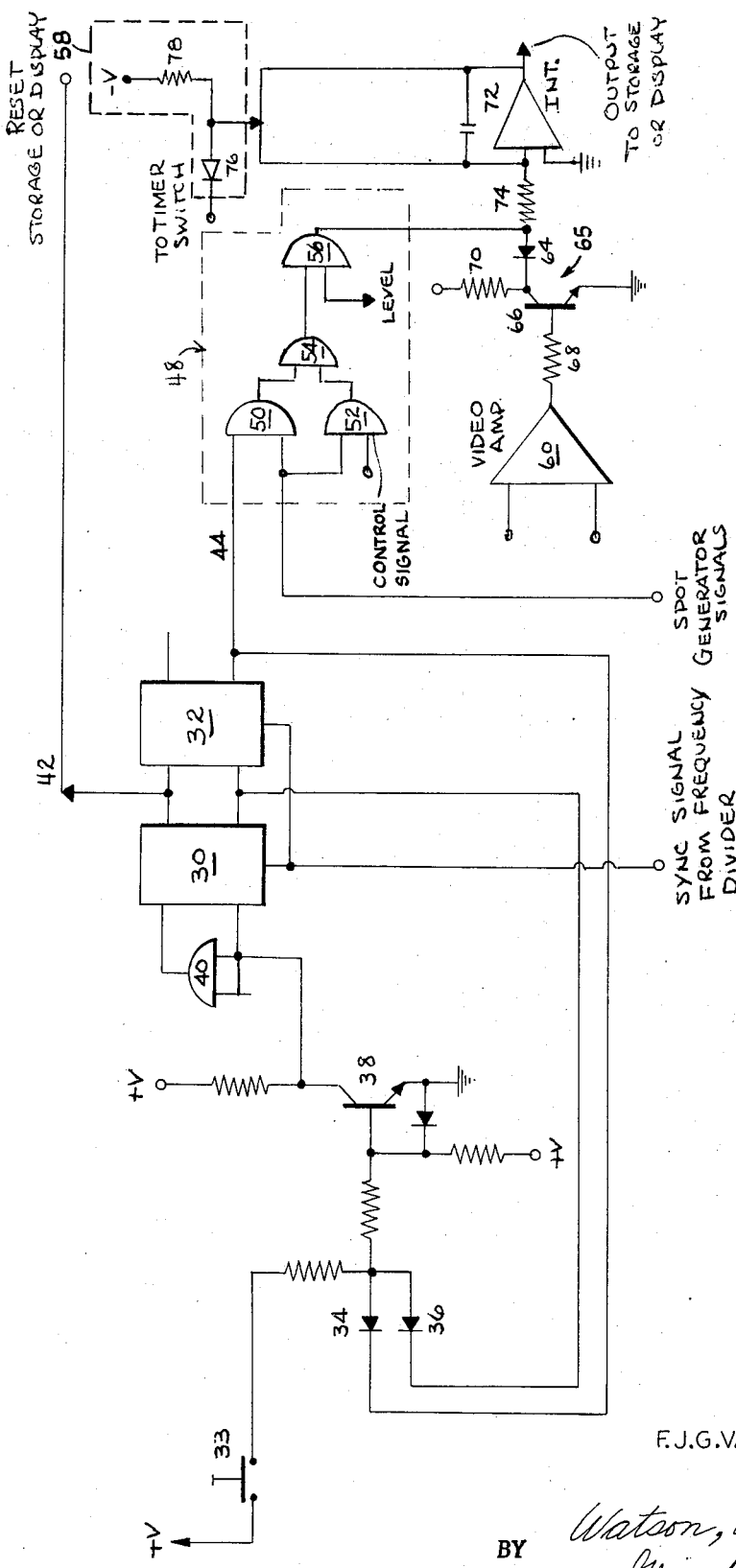

SELECTIVE INFORMATION RETRIEVAL SYSTEMS

This is a continuation, of application Ser. No. 820,595, filed Apr. 30, 1969 now abandoned.

This invention relates to gating circuits for selecting or extracting specific and desired information from a recurrent cyclic event, and more particularly, to gating circuits for gating a selected portion of a video signal into a storage or display apparatus.

U.S. Pat. No. 3,073,521, issued Jan. 15, 1963 to the present inventor, describes a method and apparatus for the electronic counting of an image which is projected onto a photo conducting mosaic by means of an electron beam, and scanning and gating circuits such that images displayed on the photo-conducting mosaic are electronically counted. This invention provides an improved gating circuit which can be used in conjunction with the apparatus disclosed in the aforesaid patent to provide an improved apparatus for counting images which have been projected onto a photo-conducting mosaic.

In its more broader aspects, the gating circuitry herein disclosed has application in the general field of data retrieval wherein it is desired to obtain information contained in a selected portion of a recurrent or cyclic event. Such an event may be represented by a train of pulses which contain information in coded form, for example.

The circuitry essentially comprises an oscillating circuit which is stabilized by a phase comparator locking network to provide a stabilized input to a frequency divider network for generating the required reference pulses for counting or displaying selected portions of recurrent or cyclic information which may be contained in a train of pulses. The train of pulses may, for example, consist of the output from the video stage of an Iconoscope which contains information relating to the image on the Iconoscope and wherein it is desired to select a portion of that image for storage, display, or counting. The particular portion of the video output that is selected to be counted or displayed is varied in accordance with the output of a variable spot generator.

The frequency divider network includes a unique two and one-half line delay network which provides a signal to the horizontal and vertical sweep generators of a video system such that a line may be presented on the face of the display for every two and one-half lines of the scan frequency to achieve interlaced scanning.

The video amplifier output is gated to the storage or display apparatus by means of a gate or delay circuit which operates on a selected divided frequency provided by the frequency divider circuit from the basic oscillator circuit.

A primary object of the invention is to provide apparatus for gating a pre-selected portion of recurrent or cyclic information which may be in the form of a pulse train.

A further object of the invention is to provide improved gating circuitry, which is less complex and more accurate than prior known gating circuits, for examining a particular portion of a recurrent or cyclic event.

It is a more particular object of the invention to provide a delay circuit for blanking a given portion of the lines which are scanned by a video circuit and to provide gate means which operate in association with the output of the video amplifier of the video circuit to gate a particular portion of the video signal to a storage or display apparatus in accordance with a predetermined stabilized delay signal derived from the basic line frequency of the video system.

Other details, objects and features of the invention will be apparent to those skilled in the art; however, the following description of the disclosed embodiments is given merely in the way of an example to illustrate the operation of the apparatus and is not to be construed as limiting the disclosed invention to the particular embodiments described, the invention being limited solely by the accompanying claims.

The following description is aided with reference to the accompanying drawings, in which:

FIG. 3 is an illustration of a particular embodiment of a means for controlling the information gated to a storage or display apparatus.

Figure 1:
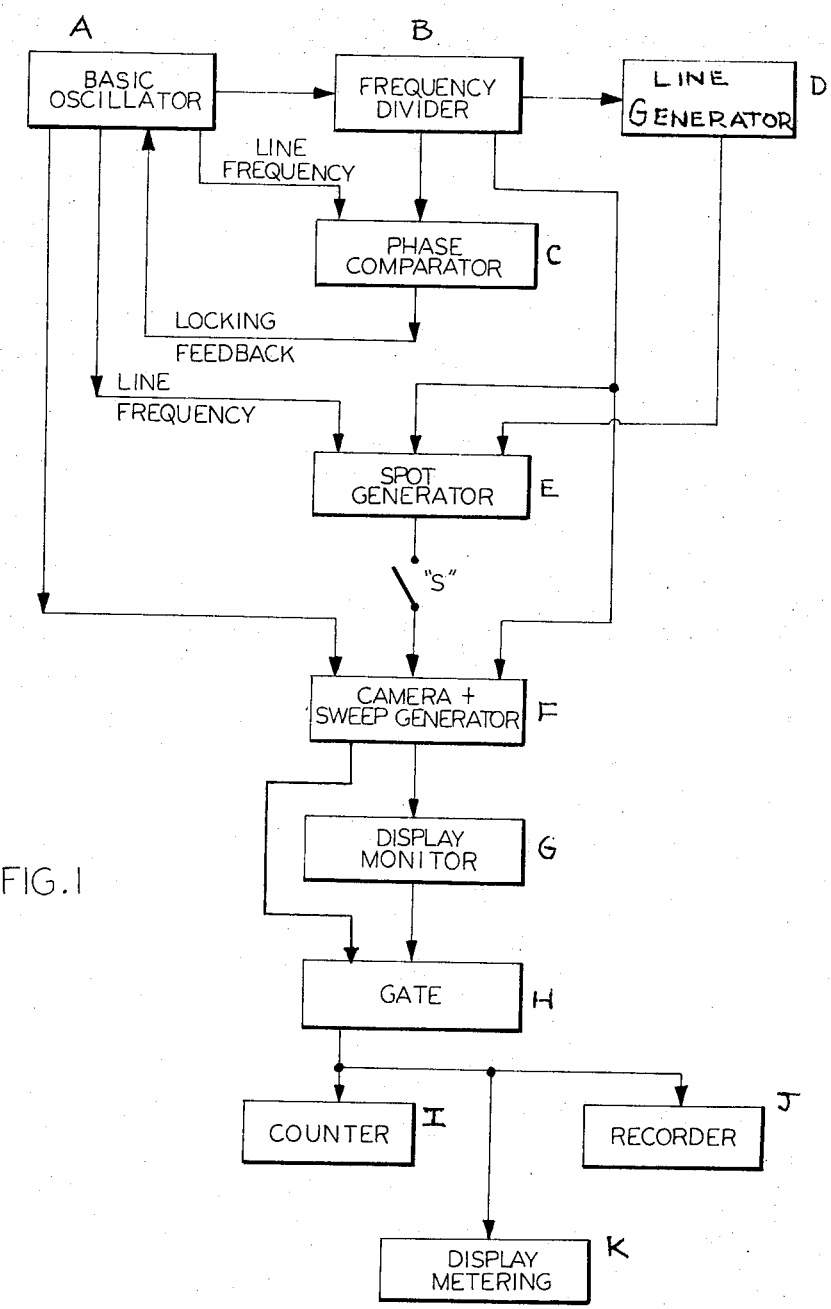
FIG. 1 represents a block diagram of a system using the gating and delay circuits of the invention.

An illustrative environment in which the novel gating and delay circuits of the present invention may be utilized is represented by the block diagram shown in FIG. 1. The basic oscillator A is selected to operate at twice the line frequency of a given video system which has displayed thereon, by way of example, an image which is desired to be analyzed such as by counting the number of spots contained in a given line or a portion of a line thereof. The image may be that which is obtained on the surface of a photo-conducting tube and which image can be analyzed by the electron beam of the video system which is caused to scan the image in a desired pattern. The output of the basic oscillator is divided by a frequency divider network B so as to provide a selected output signal of a given frequency, which is in this instance a 30 cycle per second pulse output, and a selected signal to a phase comparator C such that the basic oscillator may be stabilized with the basic frequency of the supply voltage. The phase comparator and locking feedback signal are well known to the art and are incidental to the instant invention.

The output of the frequency divider is fed to a recurrent event or line generator D in the present embodiment, which provides an additional raster having either one, two three, six, 12, etc., lines. The output of the line generator, along with the line frequency from the basic oscillator and a line pulse from the frequency divider, is supplied to the input of a variable spot generator E. The variable spot generator is varied in accordance with the particular spot or line of information stored on the photo-conducting mosaic which is desired to be analyzed by the electron beam of the video system (which is not shown here for purposes of clarity). The variable spot signal from the output of the spot generator E is then connected through switch S to the sweep generating circuitry F of the video system along with separate line and frame pulses from the basic oscillator A and frequency divider network B, respectively. Switch S represents a start switch for initiating the gating of information into the storage or display apparatus. The output of the sweep generator F may be monitored using, for example, a display monitor G, such as a cathode ray tube or electro-luminescent panel. This display monitor gives a diagrammatic representation of the photo-conducting mosaic which contains the information to be analyzed. It is evident from the foregoing description that the electron beam is controlled in accordance with the signals provided to the sweep generator and is varied in accordance with the variable output of the spot generator in association with the line and frame signals from the basic oscillator and frequency divider networks.

Another output from the display monitor may be taken, for example, from the output stage of the video amplifier and provided as an input to the gate circuit H. The signal from line generator D is also provided to the gate circuit H in order to provide a reference or standard by which the information is gated to the storage or display apparatus. The gate signal is controlled by a start signal input which causes the gate to repetitively re-cycle as long as the start signal is present. The output of the gate circuit may be provided simultaneously or individually to either one of a counter I, recorder J or a display metering apparatus K, such as an oscilloscope.

Figure 2:
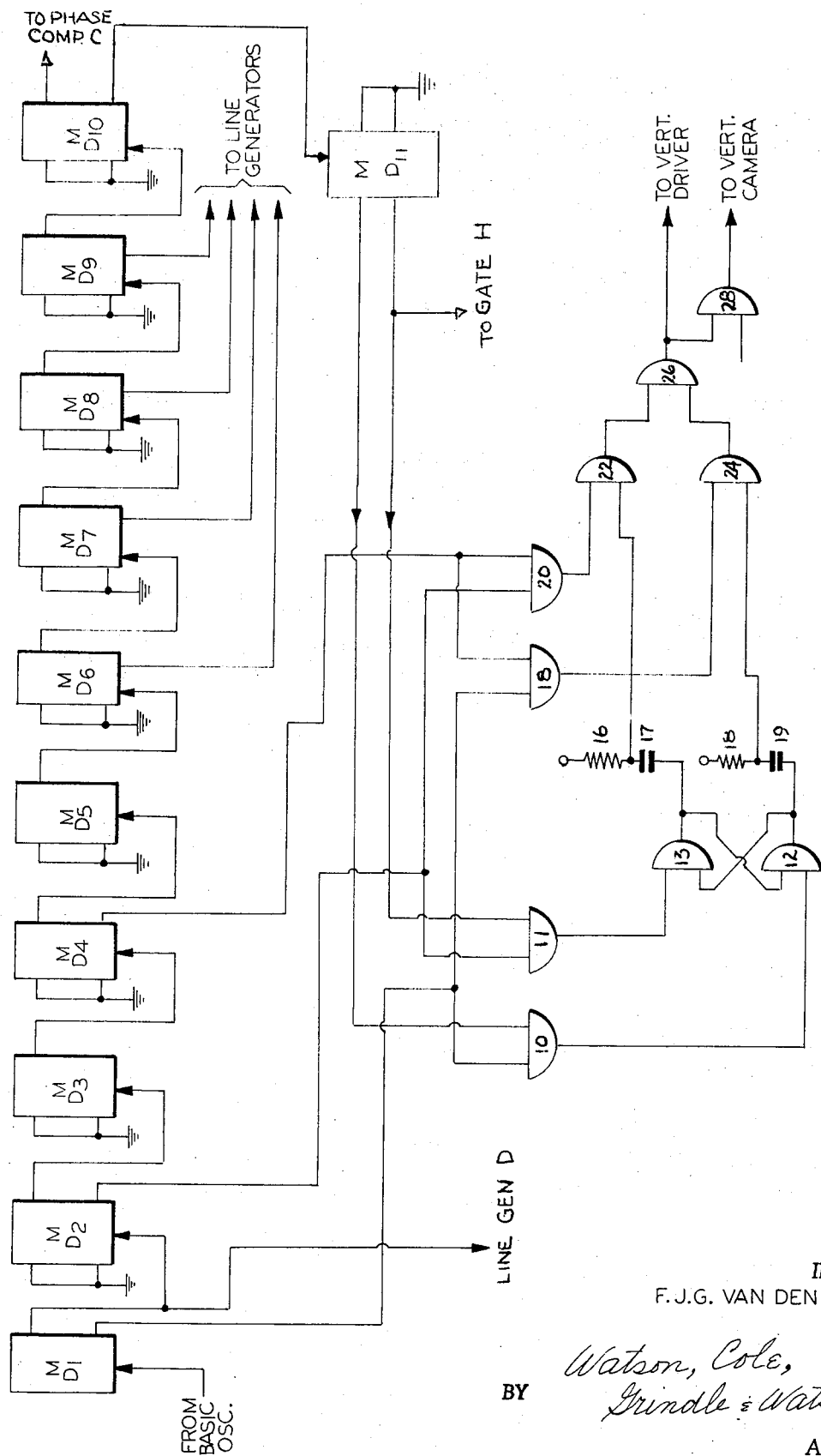
FIG. 2 is a combined schematic and block diagram of the frequency divider network and two and one-half line delay network.

FIG. 2 shows a block diagram of an eleven-stage frequency divider network and a 2 and ½ line delay network which operates from selected signals provided by the frequency divider network in order to provide control signals to the vertical drive circuitry of the electron analyzing beam. The operation of the frequency divider will not be described in detail as its operation is apparent to those skilled in the art. Briefly, the frequency divider network receives a basic input from the oscillating circuit and divides the frequency of this input to the desired frame frequency. In the present application the desired frame frequency is 30 cycles per second and the basic oscillator operates at a frequency of 61,440 cycles per second. It is apparent that the number of stages may be varied in accordance with the basic frequency of the oscillator and the output frequency desired.

The output from the first stage of the frequency divider is provided to the horizontal stage of the line generator and the frame frequency output at 30 cycles per second is provided to the first amplifier stage of the same generator. Outputs from the frequency divider are also provided to the line delay network, the operation of which will now be described.

The 2 and ½ line delay network shown in FIG. 2 comprises a number of coincident gates (AND gates) and a pair of cross-coupled one-shot multivibrators. The inputs to AND gate 10 are provided from the output of the first stage of the frequency divider and the last stage of the frequency divider which is a signal at 30 cycles per second. The inputs to AND gate 11 are provided from the output of the second stage of the frequency divider network and also from the last stage of the frequency divider network. AND gates 10, 11 respectively gate the differential between the first stage and last stage output of the frequency divider and the second stage and last stage output of the frequency divider network.

AND gate 18 receives one input from the output of the first stage of the frequency divider and an input from the output of the fourth stage of the frequency divider. AND gate 20 receives an input from the output of the second stage of the frequency divider and an input from the fourth stage of the frequency divider. The respective outputs of AND gates 18, 20 are the respective differential frequencies between the first and fourth stage outputs and the second and fourth stage outputs of the frequency divider.

The aforementioned outputs from AND gates 10, 11 are provided to the input of cross-coupled multivibrators 12, 13, respectively. The output from multivibrator 12 is differentiated by resistor 18 and capacitor 19, which form a differentiating circuit, and provided along with the output of AND gate 18 to AND gate 24. Similarly, the output of multivibrator 13 is differentiated by resistor 16 and capacitor 17 and provided along with the output of AND gate 20 to AND gate 22. The outputs of AND gates 22, 24 are gated by AND gate 26 into alternate frame pulses, which are delayed by 2 and ½ lines, and provided to the vertical drive stage of the electron scanning beam. An additional output is provided for the vertical stage of the camera by AND gate 28.

FIG. 3 is an illustrative drawing of an embodiment of a delay circuit for gating the desired information into a storage or display apparatus. Thirty cycle pulses from the output of the frequency divider are provided as inputs to flip-flop circuits 30, 32. When switch 33 is momentarily closed to open diode gates 34, 36 to activate driver amplifier 38, flip-flop multivibrators 30, 32 are triggered. NAND gate 40, having parallel connected inputs, serves as an input stage to multivibrator 30. In accordance with the operation of multivibrators 30, 32 the output signals at 42 and 44 are of the same frequency but delayed with respect to one another by one-half their respective pulse width. The signals at 42 provide a means for resetting a storage or display apparatus. The signal at 44 is provided as an input to exit gate 48 along with the output signals from the variable spot generator which represent additional variable spot raster information. The operator, by adjusting the output from the variable spot generator, controls the information which is selected from the video tube. An embodiment of circuitry for the variable spot generator is disclosed in co-pending application Ser. No. 531,703, now U.S. Pat. No. 3,507,987, filed Mar. 4, 1966 by the same inventor.

Exit gate 48 consists of AND gates 50, 52, 54 and 56. The inputs to AND gate 50 consist of a control signal 44 and the signal from the spot generator indicating the information on each frame to be selected from a given line or lines of the video tube. The input to AND gate 52 consists of the signals from the spot generator as well as a control signal from an on/off switch (not shown) for controlling the operation of gate 58 and, more specifically, the gating of the signals from the spot generator. The coincidence of the signals 44, the signals from the spot generator, and the activation of the switch input to AND gate 52 causes the signals from the spot generator to be outputted from AND gate 54 to AND gate 56. A level control for adjusting the activation of AND gate 56 is provided and the spot generator signals are passed to control the output of video amplifier 60, which is part of the video system not forming a part of this invention, by means of amplifier 65 and diode 64.

The video signals from video amplifier 60 are provided to the base of transistor 66 via resistor 68. The emitter of transistor 66 is grounded and the collector of the transistor returned to a positive voltage source through resistor 70. The video signals are provided to collector 72 through resistor 74 when diode 64 is activated by the output from AND gate 56.

One input of collector 72 is grounded and the other receives the video information passed through resistor 74. The period of integration for collector 72 is controlled by a timer switch (not shown) through diode gate 58 which consists of diode 76 and resistor 78 as shown in FIG. 3. In the particular embodiment described herein, the timer switch is set to activate diode gate 58 for a one second interval, thereby allowing collector 72 to integrate the video signals for a one second period. Timer switch may be any timer mechanism known to those skilled in the art which is also preferably adjustable to provide a variable time control of diode gate 58 so that the video signals may be integrated over a lesser or a greater period than one second intervals. In practice, the timer switch will be adjusted to operate in conjunction with, for example, a recording pen and the time will be selected to be compatible with the time it takes the recording pen to trace across the record. The timer switch is any timer switch known to the art that provides a suitable electrical output to control diode switch 58. The output from collector 72 is then provided to the input of a storage or display apparatus.

Thus, in accordance with the aforedescribed embodiment of the invention, circuitry is provided for selecting information from a video system. The gate circuitry outputs selected information from the video system in accordance with signals from a spot generator which determines the particular information which is to be selected from the video system. This is accomplished in accordance with the invention since the output signals 44 are synchronized with the information contained in video amplifier 60 so that the spot generator signals will activate diode 64 so that the proper information is selected from the video amplifier to be integrated and sent to the display apparatus.

The delay line network described above controls the vertical driver of the video system and the camera of the video system to provide for interlaced scanning. Although a two and one-half line delay circuit has been described above, it will be apparent to those skilled in the art that the circuitry can be modified to provide for any number or fraction of line delays to accomplish different amounts of interlaced scanning.

The aforedescribed circuitry preferably operates in conjunction with an ultra-violet microscope system which is fully disclosed in applicant's aforementioned U.S. Pat. No. 3,507,987 and the description of this invention is to be taken in conjunction with the description set forth in that Patent.

Those skilled in the art will recognize other modifications of the apparatus. While preferred embodiments of the invention have been shown and described, it will be apparent that changes may be made without departing from the principles and spirit of the invention, the scope of which is defined by the appended claims. Accordingly, the foregoing embodiments are to be considered illustrative only, rather than restrictive of the invention, and those modifications which come within the meaning and range of equivalency of the claims are to be included.

What I claim is:

1. Apparatus for gating selected information from a photoconductive mosaic to a first display device, comprising;

means for generating a plurality of synchronizing signals from a reference source, means for reading out data from said photoconductive mosaic, first means responsive to said plurality of synchronizing signals for generating signals defining said data to be read out from said photoconductive mosaic, second means responsive to at least one of said plurality of synchronizing signals for generating a control signal having the same frequency as said at least one synchronizing signal, means for collecting said selected data and transmitting it to said first display device, means for gating the data readout from said photoconductive mosaic to said means for collecting and controlled by said control signal and said means for reading data, said first means responsive to said plurality of synchronizing signals including a pair of gating circuits, each gating circuit having an output cross-coupled to the input of the other gating circuit, said responsive means further including output gates and first, second, third and fourth gates, said first and second gates providing inputs to said pair of gating circuits, said third and fourth gates each providing input signals to said output gates, said output gates are responsive to the output signals from said pair of gating circuits to provide signals defining the data readout from said photoconductive mosaic.

2. Apparatus according to claim 1 wherein said plurality of synchronizing signals includes a synchronizing output signal and said first gate provides an input signal representative of the frequency difference between one of said plurality of synchronizing signals and said synchronizing output signal, said second gate provides an input signal representative of the frequency difference between another of said plurality of synchronizing signals and said synchronizing output signal, said third gate provides an input signal representative of the frequency difference between the frequency of said frequency source and another of said plurality of synchronizing signals, and said fourth gate provides an input signal representative of the frequency difference between said two another of said plurality of synchronizing signals.

3. Apparatus according to claim 2 wherein said first means responsive to said plurality of synchronizing signals further includes differentiating means for differentiating the output signals of said pair of gating circuits.

4. Apparatus according to claim 1 wherein said means for generating a control signal includes a pair of one-shot multivibrators, said multivibrators having paralleled inputs and each multivibrator providing an output signal which forms said control signal and an additional control signal, means for generating a control input signal, said means for generating a control signal further includes feedback means for gating said control input signal to one of said miltivibrators, whereby said control signal and said additional control signal have the same frequency and the multivibrator output signals are interlaced with one another.

5. Apparatus according to claim 1 further comprising timing means for altering the integrating interval of said means for collecting.

* * * * *